United States Patent
Kirschbaum

(10) Patent No.: US 7,643,269 B2
(45) Date of Patent: Jan. 5, 2010

(54) ELECTRODE FOR AN ELECTRICAL COMPONENT, COMPONENT WITH THE ELECTRODE, AND MANUFACTURING METHOD FOR THE ELECTRODE AND THE COMPONENT

(75) Inventor: Thomas Kirschbaum, Rechberghausen (DE)

(73) Assignee: Kemet Electronics Corporation, Simpsonville, SC (US)

( * ) Notice: Subject to any disclaimer, the term of this patent is extended or adjusted under 35 U.S.C. 154(b) by 737 days.

(21) Appl. No.: 11/339,276

(22) Filed: Jan. 25, 2006

(65) Prior Publication Data

US 2006/0286760 A1 Dec. 21, 2006

(30) Foreign Application Priority Data

Jun. 17, 2005 (DE) .................. 10 2005 028 262

(51) Int. Cl.
*H01G 9/04* (2006.01)
*H01G 9/042* (2006.01)
*H01G 9/052* (2006.01)

(52) U.S. Cl. ................ 361/528; 361/523; 361/524; 361/529; 361/532; 29/745; 29/746

(58) Field of Classification Search .......... 361/523, 361/524, 528, 529, 532; 29/745, 746
See application file for complete search history.

(56) References Cited

U.S. PATENT DOCUMENTS 3,481,029 A 12/1969 Wittke
4,007,122 A 2/1977 Owens et al.
4,910,645 A 3/1990 Jonas et al.
5,424,907 A 6/1995 Kojima et al.
6,072,694 A * 6/2000 Hahn et al. ................ 361/523
6,084,767 A 7/2000 Day et al.
6,215,651 B1 * 4/2001 Takada et al. ............... 361/523
6,483,694 B1 11/2002 Monden et al.
6,674,635 B1 * 1/2004 Fife et al. ................... 361/523
6,956,732 B1 * 10/2005 Yano et al. .................. 361/524
2003/0090859 A1 5/2003 Monden et al.

FOREIGN PATENT DOCUMENTS

| DE | 1 141 720 | 7/1963 |
| DE | 196 16 200 C2 | 7/1998 |
| DE | 199 83 598 T1 | 11/2001 |
| DE | 102004030802 | 1/2006 |
| EP | 0 984 470 A2 | 8/1999 |

OTHER PUBLICATIONS

Excerpt from the encyclopaedia "Römpp Chemic-Lexikon", p. 405, 1955.

* cited by examiner

*Primary Examiner*—Bruce F Bell
(74) *Attorney, Agent, or Firm*—Joseph T. Guy, Agent; Nexsen Pruet, LLC

(57) ABSTRACT

An electrical component, which contains an electrode with an electrically conductive body having a dielectric surface. An amorphous layer comprising $SiO_2$, having a specific surface area of approximately 50 to 500 $m^2/g$, is arranged on the body. An electrically conductive coating is arranged on the amorphous layer. A solid electrolyte capacitor is an electrical component of this type in which, for example, the electrode is connected as the anode and the electrically conductive coating is connected as the cathode.

23 Claims, 2 Drawing Sheets

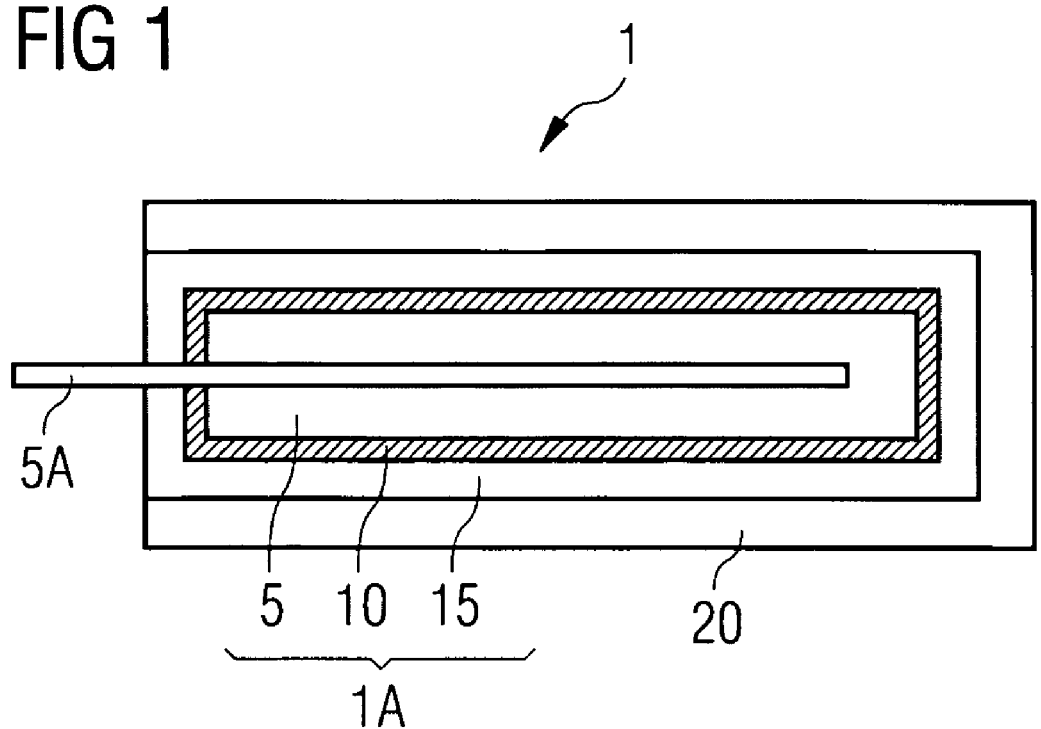

ELECTRODE FOR AN ELECTRICAL COMPONENT, COMPONENT WITH THE ELECTRODE, AND MANUFACTURING METHOD FOR THE ELECTRODE AND THE COMPONENT

RELATED APPLICATION

This patent application claims the priority of German patent application 10 2005 028 262.8, the disclosure content of which is hereby incorporated by reference.

FIELD OF THE INVENTION

The present invention is directed to an electrical component having an electrically conductive body with a dielectric surface and, in particular, to an improved technique for providing adhesion between the dielectric surface and electrically conductive polymers formed thereon without compromising the electrical characteristics of the component.

BACKGROUND OF THE INVENTION

A solid electrolyte capacitor, which has an aluminum electrode coated with a dielectric film, and a compound which has a siloxane compound applied to this dielectric film, is known from U.S. Pat. No. 6,483,694 B1. That siloxane compound is intended to improve the adhesion between the dielectric film and electrically conductive polymers still to be applied. The disadvantage of a solid electrolyte capacitor of this type is, however, that it has a reduced capacitance.

SUMMARY OF THE INVENTION

One object of the present invention is to provide an electrode for an electrical component, an electrical component with the electrode, and a manufacturing method for the electrode and the electrical component which is improved with regard to the above-mentioned disadvantages.

This and other objects are attained in accordance with one aspect of the present invention directed to an electrode for an electrical component, comprising an electrically conductive body having a dielectric surface and an amorphous layer, arranged on the body, having a specific surface area of approximately 50 to 500 $m^2/g$, this layer comprising silicon dioxide.

The advantage of an electrode according to the present invention is, among other things, that the amorphous layer, which is frequently also porous, may be used especially well as a barrier against particles which may be employed in an electrical component in which the electrode according to the present invention may be used, e.g., capacitors. A short-circuit and/or a leakage current upon contact of the particles with the dielectric material may thus be prevented especially advantageously. In addition, because of the high specific surface area of the amorphous layer, no negative effects on the ESR (Equivalent Series Resistance) are to be expected when this electrode is used in electrical components, if, for example, electrically conductive polymers or other conductive materials, such as metal oxides, are used as counter electrodes (i.e., the second electrode of the two electrodes in a component to which electrical current is applied) in electrical components together with electrodes according to the present invention. Electrodes according to the present invention may be used in electrical components which have both liquid and solid electrolytes. The components may, for example, be capacitors such as solid electrolyte capacitors.

The specific surface area of the amorphous layer arranged on the body of an electrode according to the present invention may be determined especially easily using one of the methods known to those skilled in the art, such as the BET method according to Brunauer, Emmett, and Teller. Using this method, the pore size distribution of the amorphous layer may also be determined, if necessary. The BET method assumes that gases or vapors are initially adsorbed in a monomolecular layer on solid bodies, such as the amorphous layer of the electrode, while releasing measurable adsorption heat. For example, the volume of nitrogen gas which is adsorbed at −196° C. as a function of the applied pressure on the adsorption agent, in this case the amorphous layer, is then determined.

The specific surface area of the amorphous layer is preferably 70 to 380 $m^2/g$, mostly preferred approximately 200 $m^2/g$. At such values of specific surface area, the amorphous layer of electrodes according to the present invention may be penetrated especially easily by solvents, which are used, for example, when producing electrically conductive coatings in the form of electrically conductive polymers or metal oxides. Because of this property of the amorphous layer, an electrically conductive coating may be produced in sufficient thickness on the amorphous layer using fewer reaction cycles, without having negative influences on the ESR.

In a further embodiment of the present invention, the amorphous layer has a thickness of at most 30 μm, preferably approximately 20 to 30 μm. At such a thickness, the amorphous layer of electrodes according to the present invention represents an especially effective barrier to particles, such as graphite in electrical components, which may cause a short-circuit and/or leakage current in the event of contact with the dielectric surface of the conductive body.

In a further embodiment of the present invention, the electrically conductive body of electrodes according to the present invention comprises a sintered valve metal. For purposes of the present invention, valve metals are understood as being metals which become coated with an oxide layer in the event of anodic polarity, and which do not become electrically conductive even at high voltages and possible overvoltages. These particularly include the metals tantalum, niobium, hafnium, zirconium, titanium, vanadium, tungsten, beryllium, and aluminum. Thus, for example, in the case of an electrically conductive body which comprises tantalum or niobium in sintered form, the dielectric surface of the conductive body correspondingly comprises tantalum pentoxide $Ta_2O_5$ or niobium pentoxide $Nb_2O_5$.

Another aspect of the present invention is an electrical component which comprises an electrode according to the present invention and an electrically conductive coating arranged on the amorphous layer of the electrode according to the present invention. This electrically conductive coating frequently represents the counter electrode of the electrode according to the present invention. Frequently, in the case of solid electrolyte capacitors as an example of an electrical component of this type, the electrode according to the present invention is connected as the anode and the electrically conductive coating arranged on the amorphous layer is connected as the cathode.

This electrically conductive coating advantageously contains material which comprises electrically conductive polymers that may be produced from monomers using electrochemical or chemical polymerization, for example. These monomers may be selected from pyrrole, thiophene, aniline, and their derivatives. Furthermore, the electrically conductive coating may be manufactured from electrically conductive metal oxides, such as manganese dioxide $MnO_2$. In an electrical component of this type, the electrically conductive polymers or the electrically conductive metal oxides may be produced in sufficient thickness especially easily because of the high surface area and the porous composition of the amorphous layer. Because of the large internal surface area and porosity, the amorphous layer may be easily penetrated by solvents in which the starting materials for the electrically conductive polymers or metal oxides are dissolved or suspended.

In a further embodiment, the electrically conductive coating on the amorphous layer comprises an electrically conductive polymer which is a copolymer of at least two monomers selected from pyrrole, thiophene, aniline, and their derivatives. Electrical components, such as solid electrolyte capacitors, which have these types of conductive coatings as electrodes, are distinguished in relation to known capacitors by a lower leakage current and lower ESR values while simultaneously having improved aging behavior. An especially advantageous copolymer may be manufactured in this case from the monomers pyrrole and thiophene. The manufacture of an electrically conductive coating of this type may be performed, for example, in that solvents are used which already contain mixtures of the monomers and are subsequently oxidatively polymerized chemically or electrochemically. However, it is also possible to apply the monomers to the amorphous layer in different wetting procedures. Preferred oxidation agents for the monomers cited are oxidative salts of metal ions, such as Fe(III) salts. The chemical polymerization of the mentioned monomers into the electrically conductive polymers may also be performed using other oxidation agents, containing Cu(II), Ce(IV), perchlorates, and peroxides.

The electrically conductive coating which is positioned on the amorphous layer of an electrode according to the present invention may have multiple partial layers which comprise identical or different electrically conductive polymers. In this case, the individual partial layers may be applied separately using the above-mentioned manufacturing methods. The variation and/or combination of the different monomers in different stoichiometries and/or molar ratios allows the synthesis of custom-tailored electrically conductive copolymers, which combine the desired properties of the particular monomers. Partial layers of the electrically conductive coating may also comprise electrically conductive homopolymers which were produced solely from one single monomer.

An electrical component is especially advantageous, in which the electrically conductive coating comprises an electrically conductive polymer and the amorphous layer is obtainable by drying a solution located on the electrically conductive body, this solution comprising a silica gel, and a cross-linkable silane having at least one organic substituent.

During the drying of the solution which contains the above-mentioned components, a condensation of the silicic acid particles into amorphous, polymeric silicon dioxide $(SiO_2)_x$ occurs. Simultaneously, the individual silicic acid particles are also linked to one another via the cross-linkable silane, so that the layer comprising amorphous and porous silicon dioxide already described above may be produced having a high specific surface area of 50 to 500 $m^2/g$. The organic substituents present in this case in the cross-linkable silane are also a component of the amorphous layer. The organic, electrically conductive polymers may then be bound easily as the electrically conductive coating via these organic substituents. An especially good adhesion of the electrically conductive polymers on the amorphous layer via a linkage of the polymers to the organic substituents of the amorphous layer results in this case. The organic substituents of the cross-linkable silane contain unsaturated ethylene residues or epoxide groups, for example, and are selected from vinyl groups, glycidoxypropyl groups, and methacryloxyalkyl groups, for example. Cross-linkable silanes which have organic substituents of this type are, for example, trialkoxy glycidoxyalkyl silanes, trialkoxy methacryloxyalkyl silanes, and trialkoxy vinyl silanes. Concrete examples of silanes of this type are, for example, 3-glycidoxypropyl trimethoxy silane or (3-methacryloxypropyl) trimethoxy silane. However, cross-linkable silanes having alkyl substituents and especially aromatic substituents such as aryl groups like napthyl groups are also usable. Cross-linkable silanes having substituents of this type allow, because of their high affinity to the delocalized $\pi$-electron system of electrically conductive polymers, good binding to these polymers, if electrically conductive polymers are used as the electrically conductive coatings. Cross-linkable silanes whose organic substituents may not be cleaved from the silicon atom using hydrolysis, i.e., which are not hydrolyzable, such as organic substituents which are bonded via alkylene bridges to the silicon atom, such as the glycidoxyalkyl residue cited above, are especially advantageous.

In a further embodiment of the present invention, the solution also includes a weak acid, preferably a weak organic acid. In the presence of a weak acid, the cross linking of the silicic acid may occur more rapidly.

Another aspect of the present invention is also an electrically conductive component in which the electrically conductive coating comprises an electrically conductive metal oxide, e.g., manganese dioxide, and the amorphous layer is obtainable by drying a solution located on the electrically conductive body, the solution containing a silica gel, and a cross-linkable silane having exclusively inorganic substituents and/or inorganic and organic hydrolyzable substituents.

Upon drying of such a solution, an amorphous layer arises on the surface which has no organic substituents and is, therefore, of an inorganic nature. In an amorphous layer of this type, an especially good adhesion of the inorganic electrically conductive metal oxides results. Examples of cross-linkable silanes of this type are, for example, tetraalkoxy silanes, such as tetraethoxy silane, whose four organic substituents are all hydrolyzable, or tetrahalogenated silanes, such as silicon tetrachloride $SiCl_4$, which exclusively have inorganic substituents. The degree of cross linking of the amorphous layer comprising $SiO_2$ may also be influenced easily via the number of hydrolyzable substituents on the cross-linkable silane.

As already described above, the solution may advantageously also contain a weak acid.

Another aspect of the present invention is a method for manufacturing an electrode for an electrical component, in which, in a method step A), an electrically conductive body having a dielectric surface is provided and subsequently an amorphous layer containing silicon dioxide and having a specific surface area of approximately 50 to 500 $m^2/g$ is produced on the body.

The amorphous layer may, for example, be produced in that the electrically conductive body is brought into contact in method step A) with a solution containing silicic acid and a cross-linkable silane and subsequently the amorphous layer is produced therefrom via drying. The electrically conductive body of the electrode may be brought into contact with the solution using immersion coating or spray coating, for example. During the drying, which is advantageously performed at temperatures between 40° C. and 150° C., amorphous, porous silicon dioxide particles, which may be linked to one another via the cross-linkable silane, are formed from the individual silicic acid particles using hydrolysis. Favorably, at the beginning of the drying, low temperatures between 40 to 50° C. are used in order to evaporate the solvent of the solution, such as water or aqueous organic solvents, e.g., methanol or ethanol. Subsequently, the hydrolysis and linking of the individual silicic acid particles is performed at higher temperatures of approximately 100 to 150° C.

Furthermore, the solution may contain acid, above all a weak organic acid, which accelerates the cross-linking.

A hydrophilic silicic acid may be used in method step A). A hydrophilic silicic acid of this type allows especially good adhesion of electrically conductive polymers as the electrically conductive coatings on the electrodes according to the present invention. This may be attributed to, among other things, the fact that the electrical polymers are constructed ionically and are stabilized by suitable counter ions, e.g., anions such as organic sulfonic acids and may therefore interact well with the hydrophilic silicic acids.

However, the use of hydrophobic silicic acids, which were treated, for example, with polydialkyl siloxanes, such as polydimethyl siloxane, is also possible.

The silicic acids used may, for example, be pyrogenic silicic acids, which are understood as highly dispersed silicic acids that are produced through flame hydrolysis, for example, through decomposition of $SiCl_4$ in an oxyhydrogen gas flame. However, it is also possible to use precipitated silicic acids, which are manufactured from aqueous alkali silicate solutions through precipitation using mineral acids, for example.

Preferably, a weak organic acid such as acetic acid is used as the acid. This acid favors the cleavage of the leaving groups, i.e., the substituents of the cross-linkable silanes, and additionally favors the condensation of the silicic acids into the amorphous polymeric silicon dioxide.

The solution used in method step A) advantageously has 0.1 to 10 weight-percent silicic acid, 0.1 to 10 weight-percent of a weak organic acid, 0.1 to 10 weight-percent cross-linkable silane, and approximately 10 weight-percent solvent, e.g., aqueous organic solvent or water itself. By adjusting the concentration of the silicic acid and the cross-linkable silane, the thickness of the amorphous layer produced and the degree of cross-linking of the amorphous layer may be adjusted especially easily. A solution having 1 to 4 weight-percent acetic acid as the weak acid, 1 to 4 weight-percent silica gel, and 1 to 4 weight-percent cross-linkable silane, e.g., 3-glycidoxypropyl trimethoxy silane, and 5 to 15 weight-percent ethanol is especially preferred.

Another aspect of the present invention is also a method for manufacturing an electrical component, in which, in an additional method step B) after method step A), an electrically conductive coating is produced on the amorphous layer. As already noted above, this electrically conductive coating may comprise electrically conductive polymers or electrically conductive metal oxides, such as manganese dioxide, for example.

BRIEF DESCRIPTION OF THE DRAWINGS

FIG. 1 shows an electrical component according to the present invention implemented as a solid electrolyte capacitor.

DETAILED DESCRIPTION OF THE DRAWINGS

Figure 2A:
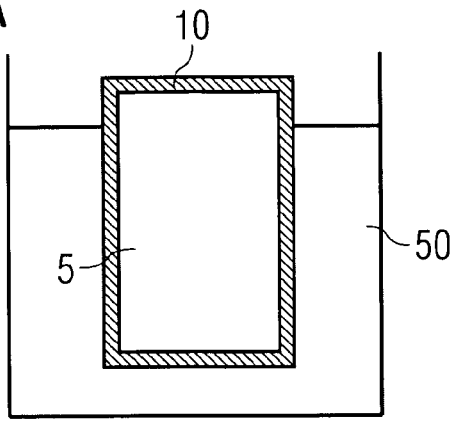
FIGS. 2A through 2D show a variation of a method according to the present invention for manufacturing an electrical component, in this case a solid electrolyte capacitor.

FIG. 1 shows, using the example of a tantalum solid electrolyte capacitor, an electrically conductive body 5 comprising sintered tantalum metal. An anode wire 5A serves as an electrical contact to body 5. A dielectric layer 10, comprising tantalum pentoxide $Ta_2O_5$, was produced on the electrically conductive tantalum body 5 using anodic oxidation. Anodic oxidation is well known by anyone with ordinary skill in the art, and it is described, for example, in paragraph [0005] of EP 0 984 470 A2. The amorphous layer 15 made of highly porous silicon dioxide, which was produced by drying a solution made of silicic acid, cross-linkable silane, and weak acid, is located on the dielectric tantalum pentoxide surface 10. An electrically conductive polymer is positioned as the electrically conductive coating 20 on this amorphous silicon dioxide layer 15. Because of the high specific surface area and porosity of the amorphous silicon dioxide layer 15, the electrically conductive polymer, which is connected as the cathode in the solid electrolyte capacitor, may be produced easily. In this case, the amorphous silicon dioxide layer may additionally obstruct migration of graphite particles and thus prevent the short-circuits and/or leakage currents which arise in the event of contact of the graphite particles with the dielectric layer. The graphite particles are a component of a graphite layer (not shown), which is frequently applied to the electrically conductive polymers for the electrical contact.

FIG. 2A represents a porous tantalum sintered body 5 having a dielectric layer 10 made of tantalum pentoxide during method step A) of a method according to the present invention. In this case, the tantalum sintered body 5 is introduced into a solution 50 which contains the silicic acid, the cross-linkable silane, solvent, and a weak acid. After removing the tantalum sintered body 5 from the solution 50, a solution film remains on the surface of the body. A surface film of this type may also be produced, for example, using spray coating.

Figure 2B:
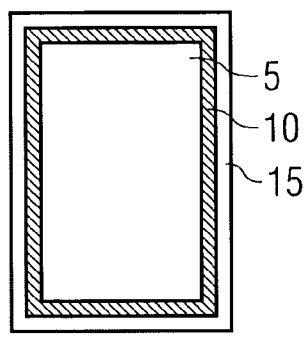

An electrode according to the present invention is shown after method step A) in FIG. 2B. The liquid film applied in FIG. 2A has been converted using drying into an amorphous silicon dioxide coating 15 having the above-mentioned high specific surface area and porosity.

Figure 2C:
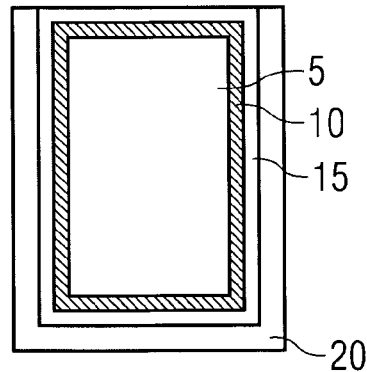

FIG. 2C shows a component according to the present invention during method step B) of the method according to the present invention. In this case, an electrically conductive polymer was produced as the electrically conductive coating 20, which may be used as the cathode in the component, on the amorphous silicon dioxide coating 15. As already noted above, this electrically conductive coating may contain homopolymers or copolymers made of different monomers. Because of the especially high internal surface and porosity of the amorphous silica coating 15, it may be penetrated especially well by the solvent of the monomer solutions, so that sufficiently thick conductive coatings 20 made of electrically conductive polymers may be produced using fewer reaction cycles, without having negative influences on the ESR.

Figure 2D:
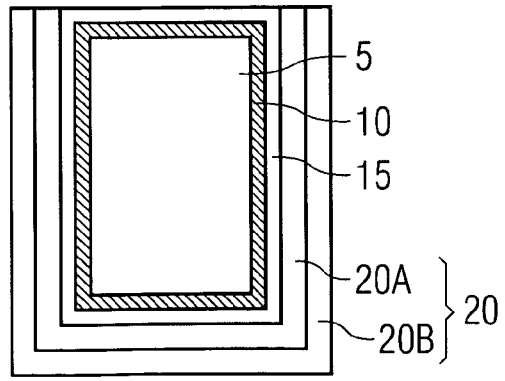

A tantalum solid electrolyte capacitor according to the present invention is shown in FIG. 2D, in which two electrically conductive partial layers 20A and 20B made of identical or different homopolymers or copolymers of electrically conductive polymers have been produced on the amorphous silicon dioxide coating 15 during method step B). As already noted above, the electrical properties of solid electrolyte capacitors may be tailored especially easily to the particular conditions using differently constructed partial regions of the electrically conductive polymers.

Embodiment 1

An anodized tantalum sintered body is immersed in a solution comprising 0.1 to 10 weight-percent acetic acid, 0.1 to 10 weight-percent Aerosil R200 from Degussa, 0.1 to 10 weight-percent 3-glycidoxypropyl trimethoxy silane, and 10 weight-percent ethanol and water. Subsequently, step-by-step drying is performed at 40° C. followed by 150° C., in order to first remove the solvent as carefully as possible and subsequently allow the formation of the amorphous silicon dioxide layer at higher temperatures. The anodized tantalum sintered body is then immersed in a first solution containing a mixture made of two monomers. The solution contains 0.5 to 5 weight-percent 3,4-ethylene dioxythiophene, 0.5 to 5 weight-percent pyrrole, 10 to 20 weight-percent sodium alkyl naphthyl sulfonate, and 5 to 25 weight-percent isopropanol, with the remainder being water. Subsequently, the anodized tantalum sintered body is immersed in an aqueous solution of an oxidation agent containing 10 to 25 weight-percent iron(II) sulfate, 0.5 weight-percent sulfuric acid, and water. The formation of the cathode from the electrically conductive copolymer of pyrrole and ethylene dioxythiophene is subsequently performed at a temperature between −5 and 105° C. The electrical component is subsequently washed in an aqueous-acid solution, which may contain toluol sulfonic acid, phosphoric acid, and citric acid, for example, and reformed. In this way, a first partial coating having electrically conductive polymer may be produced. A method of this type may be repeated between 5 and 12 times in order to apply further electrically conductive polymer partial regions. An electrical component manufactured in this way has an ESR of 5-15 mOhm and an LC (leakage current) of 1-5 μA.

Embodiment 2

Instead of the anodized tantalum sintered body from Embodiment 1, an anodized niobium sintered body was used. All further method steps correspond to the first exemplary embodiment.

An electrical component manufactured in this way has an ESR of 10-25 mOhm and an LC (leakage current) of 5-10 μA.

Embodiment 3

Instead of an anodized tantalum sintered body, an anodized aluminum film was used as the electrically conductive body. The remaining method steps correspond to those cited in Embodiment 1.

An electrical component manufactured in this way has an ESR of 5-10 mOhm and an LC (leakage current) of 5-20 μA.

The present invention is not restricted to the exemplary embodiments described here. Further variations are possible, for example, in the selection of the sintered metals for the electrically conductive body and the composition of the solution from which the amorphous silicon dioxide coating is manufactured. The invention is embodied in each novel characteristic and each combination of characteristics, which includes every combination of any features which are stated in the claims, even if this combination of features is not explicitly stated in the claims.

I claim:

1. An electrode for an electrical component comprising: an electrically conductive body having a dielectric surface and an amorphous $SiO_2$ comprising layer arranged on said dielectric having a specific surface area of approximately 50-500 $m^2/g$.

2. The electrode according to claim 1, wherein the amorphous layer has a maximum thickness of 30 μm.

3. The electrode according to claim 1, wherein the electrically conductive body comprises a sintered valve metal.

4. The electrode according to claim 1, wherein the dielectric surface of the ceramic body comprises $Ta_2O_5$ or $Nb_2O_5$.

5. An electrical component comprising: an electrode according to claim 1, and an electrically conductive coating arranged on the amorphous layer.

6. The electrical component according to claim 5, wherein the electrically conductive coating contains a material that is selected from a group containing the following elements: electrically conductive polymers and $MnO_2$.

7. The electrical component according to claim 5, wherein the electrically conductive coating comprises an electrically conductive polymer that is a copolymer made of at least two monomers selected from pyrrole, thiophene, aniline, and their derivatives.

8. The electrical component according to claim 5, wherein the electrically conductive coating has multiple partial coatings, which comprise identical or different electrically conductive polymers.

9. The electrical component according claim 5, wherein the electrically conductive coating comprises an electrically conductive polymer, and wherein the amorphous layer is obtainable by drying a solution located on the electrically conductive body, which comprises the following components: a silica gel and a crosslinkable silane having at least one organic substituent.

10. The electrical component according to claim 5, wherein the electrically conductive coating comprises an electrically conductive metal oxide, and the amorphous layer is obtainable by drying a solution located on the electrically conductive body, which comprises the following components: a silica gel and a crosslinkable silane having substituents which are selected from inorganic and organic hydrolyzable substituents.

11. A method for manufacturing an electrode for an electrical component comprising the steps of: A) providing an electrically conductive body having a dielectric surface, and B) producing an amorphous layer having a specific surface area of approximately 50-500 $m^2/g$ and containing $SiO_2$ on the body.

12. The method according to claim 11, wherein, in method step B), the electrically conductive body is brought into contact with a solution containing silicic acid, and a cross-linkable silane; and subsequently the amorphous layer is produced using drying.

13. The method according to claim 12, wherein a hydrophilic silicic acid is used as the silicic acid in method step B).

14. The method according to claim 12, wherein a pyrogenic silicic acid is used as the silicic acid in method step B).

15. The method according to claim 12, wherein, in method step B), a compound is used as the cross-linkable silane which is selected from: tetraalkoxy silane, trialkoxy glycidoxyalkyl silane and trialkoxy methacryloxyalkyl silane, trialkoxy vinyl silane, tetrahalogenated silane.

16. The method according to claim 12, wherein a weak organic acid is additionally used in the solution in method step B).

17. The method according to claim 12, wherein, in method step B), a solution is used which comprises 0.1 to 10 weight-percent silicic acid, 0.1 to 10 weight-percent of a weak organic acid, 0.1 to 10 weight-percent cross-linkable silane, and approximately 10 weight-percent solvent.

18. The method according to claim 12, wherein drying is performed at temperatures between 40° C. and 150° C. in method step B).

19. The method according to claim 12, for producing an electrical component, further comprising the step of: C) producing an electrically conductive coating on the amorphous layer.

20. The method according to claim 19, wherein, in method step C), the electrically conductive coating is produced via polymerization of monomers, selected from pyrrole, thiophene, aniline, and their derivatives.

21. The method according to claim 20, wherein a copolymer made of at least two different monomers is produced in method step C).

22. The method according to claim 19, wherein an electrically conductive coating is produced that has multiple partial layers which comprise identical or different electrically conductive polymers.

23. The electrical component according to claim 9, wherein the solution additionally contains a weak acid.

* * * * *